(12) United States Patent
Chae (10) Patent No.: US 12,543,533 B2
(45) Date of Patent: Feb. 3, 2026

(54) ARRANGEMENT JIG FOR A SIDE TRACK BUFFER, SIDE TRACK BUFFER SYSTEM HAVING AN ARRANGEMENT JIG AND METHOD OF ARRANGING A SIDE TRACK BUFFER USING AN ARRANGEMENT JIG

(71) Applicant: SEMES CO., LTD., Cheonan-si (KR)

(72) Inventor: Sunggun Chae, Cheonan-si (KR)

(73) Assignee: Semes Co., Ltd., Chungcheongnam-do (KR)

( * ) Notice: Subject to any disclaimer, the term of this patent is extended or adjusted under 35 U.S.C. 154(b) by 678 days.

(21) Appl. No.: 17/970,041

(22) Filed: Oct. 20, 2022

(65) Prior Publication Data

US 2023/0215750 A1   Jul. 6, 2023

(30) Foreign Application Priority Data

Dec. 31, 2021 (KR) .................. 10-2021-0193742
Apr. 8, 2022 (KR) .................. 10-2022-0044149

(51) Int. Cl.
*H01L 21/677* (2006.01)
*G01B 5/14* (2006.01)
*G05B 19/402* (2006.01)
*G05D 3/20* (2006.01)

(52) U.S. Cl.
CPC .......... *H01L 21/67736* (2013.01); *G01B 5/14* (2013.01); *G05B 19/402* (2013.01); *G05D 3/20* (2013.01); *H01L 21/67706* (2013.01); *H01L 21/67724* (2013.01); *H01L 21/6773* (2013.01); *H01L 21/67733* (2013.01); *G05B 2219/49113* (2013.01)

(58) Field of Classification Search
None
See application file for complete search history.

(56) References Cited

U.S. PATENT DOCUMENTS

| 8,702,365 | B2 * | 4/2014 | Park | H01L 21/67769 414/217 |
|---|---|---|---|---|
| 10,535,543 | B2 * | 1/2020 | Watanabe | G05B 19/42 |
| 10,879,095 | B2 * | 12/2020 | Zumkeller | H01L 21/6719 |
| 2022/0310436 | A1 * | 9/2022 | Kitagishi | H01L 21/68707 |

FOREIGN PATENT DOCUMENTS

JP          2564432 Y2 *   3/1998

* cited by examiner

*Primary Examiner* — Peter J Macchiarolo
*Assistant Examiner* — Jermaine L Jenkins
(74) *Attorney, Agent, or Firm* — Harness, Dickey & Pierce, P.L.C.

(57) ABSTRACT

Provided are an alignment jig, a side track buffer system including the same, and an alignment method using the same. The alignment jig includes a horizontal jig fixed to a bottom plate of a side track buffer to extend in a horizontal direction to a lower portion of the transfer rail, and a vertical jig fixed to the transfer rail to extend downward in a vertical direction so as to be adjacent to a top surface in the horizontal direction. A separation distance between an intersection point of the vertical jig and the horizontal jig and a central portion of the bottom plate is detected as a buffer separation distance, and a buffer frame is horizontally moved automatically or manually to allow the buffer separation distance to match a reference separation distance, so that the side track buffer is installed in an accurate position.

20 Claims, 4 Drawing Sheets

ARRANGEMENT JIG FOR A SIDE TRACK BUFFER, SIDE TRACK BUFFER SYSTEM HAVING AN ARRANGEMENT JIG AND METHOD OF ARRANGING A SIDE TRACK BUFFER USING AN ARRANGEMENT JIG

CROSS-REFERENCE TO RELATED APPLICATION

This application claims priorities to Korean Patent Application No. 2021-0193742 filed on Dec. 31, 2021 in the Korean Intellectual Property Office (KIPO) and Korean Patent Application No. 2022-0044149 filed on Apr. 8, 2022 in the Korean Intellectual Property Office (KIPO) the contents of which are herein incorporated by reference in its entirety.

BACKGROUND

1. Field

Example embodiments of the present disclosure relate to an alignment jig for arranging a side track buffer, a side track buffer system including an alignment jig, and a method of arranging a side track buffer by using an alignment jig. More particularly, Example embodiments of the present disclosure relate to an alignment jig for arranging a side track buffer for manufacturing a semiconductor element, which capable of temporarily storing a front opening unified pod (FOUP) for manufacturing a semiconductor element, a side track buffer system including such alignment jig, and a method of arranging a side track buffer by using the alignment jig.

2. Related Technology

A semiconductor element may be manufactured by sequentially applying a plurality of unit processes to a wafer, which is a target substrate. In this case, the wafer may be accommodated in a front opening unified pod (FOUP) (hereinafter referred to as "FOUP") in order to prevent contamination by external particles and transferred by a conveyance system that connects manufacturing facilities for each unit process.

In particular, a ceiling conveyance system disposed on a ceiling of a semiconductor fabrication facility (FAB), which is a clean room for manufacturing a semiconductor element, to automatically transfer the FOUP has been widely used as a conveyance system. When a substrate that has been processed in a facility configured to perform a unit process for manufacturing a semiconductor element is accommodated in the FOUP so as to be discharged to a load port (LP) that is adjacent to each facility, a ceiling conveyance device disposed on an upper portion of each facility may receive the FOUP to transfer the FOUP to a subsequent process facility in which a subsequent unit process is to be performed. Therefore, the substrate may move among process facilities, which are configured to perform unit processes, respectively, by the ceiling conveyance device.

The ceiling conveyance device may include: a transfer rail installed on the ceiling of the semiconductor FAB; a conveyance vehicle configured to protect the FOUP from an outside while moving along the transfer rail; and a station that is a loading/unloading target. The station may include: a load port added to a unit process facility for manufacturing a semiconductor element; and a side track buffer (STB) and an under track buffer (UTB) provided on side and lower portions of the transfer rail to store the FOUP, respectively.

In particular, the side track buffer refers to a facility that is fixed to the ceiling together with the conveyance vehicle to store the FOUP, and when the side track buffer is not accurately aligned with the conveyance vehicle, the FOUP may be damaged by an impact between a buffer port and the FOUP.

In order to determine a position of the side track buffer, an installation position of the side track buffer has been determined by actually transferring the conveyance vehicle to the transfer rail that is adjacent to the side track buffer, and directly measuring a distance between a center of the conveyance vehicle and the side track buffer located on left and right sides of the transfer rail.

However, it is not easy to directly drive the conveyance vehicle whenever the side track buffer is arranged, and since the side track buffer and the conveyance vehicle are spaced apart from each other in a vertical direction, it is difficult to detect an accurate installation position.

SUMMARY

The present disclosure has been proposed to resolve the problems described above, and one object of the present disclosure is to provide an alignment jig for arranging a side track buffer, capable of detecting an accurate installation position of the side track buffer based on a transfer rail.

Another object of the present disclosure is to provide a side track buffer system provided integrally with the alignment jig as described above.

Still another object of the present disclosure is to provide a method of arranging a side track buffer by using the alignment jig as described above.

To achieve one object of the present disclosure, according to exemplary embodiments, there is provided an alignment jig for arranging a side track buffer, the alignment jig including: a horizontal jig fastened to a bottom plate of the side track buffer to extend perpendicularly to a boundary line of the bottom plate, and formed at a top surface thereof with a distance measurement scale; a vertical jig fastened to a transfer rail of a ceiling conveyance device to extend downward so as to intersect the horizontal jig; and a detection needle fixed to an end of the vertical jig to detect the scale corresponding to an intersection point of the horizontal jig and the vertical jig so as to provide a buffer separation distance, which is a horizontal distance between the side track buffer and the transfer rail.

In one embodiment, the horizontal jig may include an elongated member including a fastening protrusion provided on a rear surface of one end of the elongated member, and including a gradation marked on the top surface of the horizontal jig in a unit of a predetermined distance and provided as the scale, so that the fastening protrusion is inserted into a fastening groove formed at a central portion of the bottom plate so as to be fastened to the bottom plate, and the gradation corresponding to the intersection point is provided as the buffer separation distance.

In one embodiment, the vertical jig may include a fastening member fastened to the transfer rail, and a vertical column fixed to the fastening member to extend downward.

In one embodiment, the transfer rail may include a pair of traveling rails arranged in parallel with each other on a same horizontal plane, and the fastening member may include a horizontal bar coupled to each of the traveling rails so as to be placed over each of the traveling rails in a direction that is perpendicular to the traveling rail.

In one embodiment, the vertical column may be coupled to a center of the horizontal bar to extend downward toward the horizontal jig.

To achieve another object of the present disclosure, according to exemplary embodiments, there is provided a side track buffer system including: a side track buffer including a buffer frame fixed to a ceiling so as be suspended from the ceiling, a bottom plate constituting a bottom of the buffer frame and disposed under a side portion of a transfer rail for a ceiling conveyance device, and at least one buffer port arranged on the bottom plate to accommodate a conveyance vehicle in which a semiconductor substrate is stored; and an alignment jig including a horizontal jig fastened to the bottom plate to extend to a lower portion of the transfer rail so as to be perpendicular to a boundary line of the bottom plate in a horizontal direction that is parallel to the bottom plate, and a vertical jig fastened to the transfer rail in a buffer region of the transfer rail to extend in a vertical direction that is perpendicular to the horizontal direction, and configured to detect a distance between an intersection point of the horizontal jig and the vertical jig and the buffer frame as a buffer separation distance.

In one embodiment, the horizontal jig may include an elongated member including a fastening protrusion protruding from a rear surface of one end of the elongated member so as to be fastened to a fastening groove formed at a central portion of the bottom plate, and including a distance measurement scale provided on a top surface that is symmetrical to the rear surface.

In one embodiment, the vertical jig may include a fastening member fastened to the transfer rail, and a vertical column fixed to the fastening member to extend downward so as to intersect the elongated member.

In one embodiment, the transfer rail may include a pair of traveling rails arranged in parallel with each other on a same horizontal plane, the fastening member may include a horizontal bar coupled to each of the traveling rails and placed over each of the traveling rails in a direction that is perpendicular to the traveling rail, and the vertical column may be coupled to a central portion of the horizontal bar to extend downward toward the horizontal jig.

In one embodiment, the alignment jig may further include a detection needle fixed to an end of the vertical column to detect the scale corresponding to an intersection point of the horizontal jig and the vertical column so as to detect a distance between the central portion of the bottom plate and the intersection point as the buffer separation distance.

In one embodiment, the side track buffer system may further include an alignment controller configured to arrange a position of the buffer frame by comparing the buffer separation distance with a reference separation distance.

In one embodiment, the alignment controller may include: a data detector connected to the vertical jig to obtain the buffer separation distance; a calculator configured to detect an alignment position of the buffer frame by comparing the buffer separation distance with the reference separation distance; and a driver configured to move the buffer frame to the alignment position.

In one embodiment, the vertical jig may include a communication device configured to transmit a data signal related to the buffer separation distance, and the data detector may include a signal receiver configured to receive the signal related to the buffer separation distance from the communication device.

In one embodiment, the calculator may be configured to obtain a distance deviation by which a center of the bottom plate moves to allow the buffer separation distance to match the reference separation distance by comparing the buffer separation distance with the reference separation distance.

In one embodiment, the distance deviation may include: a negative deviation in which a central axis of the bottom plate is adjacent to the vertical jig as the buffer separation distance is shorter than the reference separation distance; and a positive deviation in which the central axis of the bottom plate is spaced apart from the vertical jig as the buffer separation distance is longer than the reference separation distance.

To achieve still another object of the present disclosure, according to exemplary embodiments, there is disclosed a method of arranging a side track buffer. First, a side track buffer including a buffer frame fixed a ceiling so as to be suspended from the ceiling, a bottom plate constituting a bottom of the buffer frame and disposed under a side portion of a transfer rail for a ceiling conveyance device, and at least one buffer port arranged on the bottom plate to accommodate a front opening unified pod (FOUP) is temporarily installed. Then, a horizontal jig is fixed to a central portion of the bottom plate so that the horizontal jig extends to a lower portion of the transfer rail so as to be perpendicular to a boundary line of the bottom plate in a horizontal direction that is parallel to the bottom plate, and a vertical jig is fixed to the transfer rail so that the vertical jig extends in a vertical direction that is perpendicular to the horizontal direction to intersect the horizontal jig so as to detect an intersection point. Subsequently, a position of the central portion of the bottom plate is arranged by comparing a buffer separation distance, which is a separation distance between the intersection point and the central portion of the bottom plate, with a reference separation distance.

In one embodiment, the arranging of the position of the central portion of the bottom plate may be performed by: directly detecting the buffer separation distance from a distance measurement scale corresponding to the intersection point from the horizontal jig having a top surface marked with the scale; and horizontally transferring the buffer frame to match the buffer separation distance to the reference separation distance.

In one embodiment, the detecting of the buffer separation distance and the horizontally transferring of the buffer frame may be performed manually by a worker located high from a bottom so as to be adjacent to the buffer frame.

In one embodiment, the buffer separation distance may be automatically obtained from a position of the scale obtained through a detection sensor provided at an end of the vertical jig.

In one embodiment, the buffer frame may be automatically transferred by an external driver so that a deviation between the buffer separation distance and the reference separation distance is included within an error range.

In the side track buffer system including the same, and the method of arranging the side track buffer by using the same of the exemplary embodiments of the present disclosure, the vertical jig extending downward from a central portion of the transfer rail and the horizontal jig extending from the buffer frame located on the side portion of the transfer rail may be disposed, so that the buffer separation distance, which is a horizontal distance from a contact point of the vertical jig and the horizontal jig to a central axis of the buffer frame, can be easily obtained. The buffer frame may be horizontally moved to allow the buffer separation distance to match a set reference separation distance, so that the side track buffer can be accurately installed at a predetermined position. Accordingly, a collision between the buffer port and the FOUP caused by misalignment of the transfer rail and the side track buffer can be prevented.

However, effects of the present disclosure are not limited to the above-described effects, and may be variously expanded without departing from the idea and scope of the present disclosure.

BRIEF DESCRIPTION OF THE DRAWINGS

Example embodiments will be more clearly understood from the following detailed description taken in conjunction with the accompanying drawing. The following figures represent non-limiting, example embodiments as described herein.

DESCRIPTION OF EMBODIMENTS

Various embodiments will be described more fully hereinafter with reference to the accompanying drawings, in which some embodiments are shown. The invention may, however, be embodied in many different forms and should not be construed as limited to the embodiments set forth herein. Rather, these embodiments are provided so that this description will be thorough and complete, and will fully convey the scope of the invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (for example, rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include a plurality of forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-sectional illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the face through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the invention will be described in detail with reference to the accompanying drawings. Like elements or components can be indicated by like reference numerals throughout the drawings, and the repeated explanations of like elements or components may be omitted.

Figure 1:
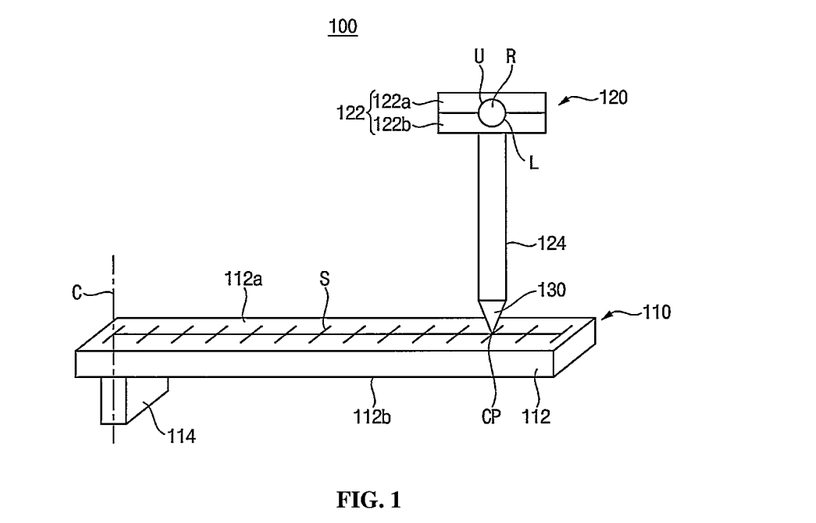
FIG. 1 is a schematic view showing an alignment jig for arranging a side track buffer according to one embodiment of the present disclosure.

FIG. 1 is a schematic view showing an alignment jig for arranging a side track buffer according to one embodiment of the present disclosure.

Referring to FIG. 1, according to one embodiment of the present disclosure, an alignment jig 100 may include a horizontal jig 110, a vertical jig 120, and a detection needle 130. The alignment jig 100 may adjust a position of a side track buffer (200 of FIG. 3) to arrange the side track buffer 200 at a position having a reference separation distance from a transfer rail R of a ceiling conveyance device.

In one embodiment, the horizontal jig 110 may be fastened to a bottom plate 220 of the side track buffer 200 to extend perpendicularly to a boundary line 224 of the bottom plate 220, and a distance measurement scale S may be selectively marked on a top surface 112a.

In example embodiments, the horizontal jig 110 may be configured as an elongated member 112 including a fastening protrusion 114 provided on a rear surface 112b of one end of the elongated member 112, and including a gradation marked on the top surface 112a in a unit of a predetermined distance and provided as the scale S. The fastening protrusion 114 may be inserted into a fastening part 222 provided at a central portion of the bottom plate 220 of the side track buffer 200, which will be described below, so as to be fixed to the bottom plate 220. For example, the fastening part 222 may be provided as a fastening groove formed in the bottom plate 220 to accommodate the fastening protrusion 114.

In this case, the elongated member 112 may be vertically aligned with the boundary line 224, which is an edge of a flat plate constituting the bottom plate 220, automatically by the coupling of the fastening protrusion 114, and may extend to a lower portion of the transfer rail R in a horizontal direction that is parallel to the bottom plate 220. Accordingly, an end of the elongated member 112 may be located under the transfer rail R.

In example embodiments, the fastening protrusion 114 may be provided as a protruding structure extending downward from the rear surface 112b, and the fastening protrusion 114 may be inserted and fixed into the fastening part 222 provided on the bottom plate 220. In this case, the fastening part 222 and the fastening protrusion 114 may have a polygonal shape, so that when the fastening protrusion 114 and the fastening part 222 are fastened to each other, the fastening protrusion 114 and the fastening part 222 may be fixed to suppress a rotational torque with respect to a central axis C passing through the central portion of the bottom plate 220 in a width direction. Accordingly, an extension direction of the elongated member 112 may be set to be a single direction that is perpendicular to the boundary line 224.

In particular, the elongated member 112 may protrude to an outside of a buffer frame 210 in a direction that is perpendicular to the boundary line 224 of the bottom plate 220 to extend to the lower portion of the transfer rail R. Therefore, the horizontal jig 110 may be configured as the elongated member 112 having a length that is sufficient to extend from an inside of the buffer frame 210 to the lower portion of the transfer rail R located on an upper side portion of the buffer frame 210.

The fastening part 222 may have the central axis C as a common central axis, and an origin point of the measurement scale S may be set to match the central axis of the fastening part 222. Accordingly, the measurement scale S may be measured by using a center of the fastening part 222 as the origin point. For example, the measurement scale S may be provided as a measurement gradation marked at regular intervals by using the center of the fastening part 222 as the origin point.

In this case, the horizontal jig 110 may be permanently fixed to the bottom plate 220 or manually fastened to the fastening part 222 by a worker, so that when it is necessary to arrange a position of the buffer frame, the horizontal jig 110 may be selectively used as an alignment jig.

In one embodiment, the vertical jig 120 may be fastened to the transfer rail R of a ceiling conveyance device (not illustrated) configured to accommodate a conveyance target substrate such as a silicon wafer to extend downward so as to intersect the horizontal jig 110. In other words, the vertical jig 120 may be fixed to the transfer rail R to extend downward to a region that is adjacent to a top surface of the horizontal jig 110.

In example embodiments, the vertical jig 120 may include a fastening member 122 fastened to the transfer rail R, and a vertical column 124 fixed to the fastening member 122 to extend downward. For example, when the transfer rail R is configured as a single traveling rail, the fastening member 122 may be configured as a pair of brackets 122a and 122b fixed to surround the transfer rail R. The vertical column 124 may be disposed on a rear surface of a central portion of the lower bracket 122b, a lower recess L for supporting the lower portion of the transfer rail R may be provided at a top surface of the central portion of the lower bracket 122b, and an upper recess U corresponding to the lower recess L may be formed on a rear surface of a central portion of the upper bracket 122a. The upper recess U and the lower recess L may be coupled to each other to provide a coupling space for accommodating the traveling rail.

In this case, the upper and lower brackets 122a and 122b may be hinged to each other on one sides thereof, so that when the upper and lower brackets 122a and 122b are fastened to the transfer rail R while opposite sides of the upper and lower brackets 122a and 122b are opened, and the transfer rail R is located in the coupling space, the upper and lower brackets 122a and 122b may be fixed to each other through a fastening terminal provided on the opposite sides thereof.

Accordingly, the fastening member 122 may be fixed to the single traveling rail R, and the vertical column 124 may extend downward from a central portion of a rear surface of the fastening member 122. For example, the detection needle 130 may be fixed to a lower portion of the vertical column 124 so that the detection needle 130 may approach the scale S marked on the horizontal member 110 to allow the scale S to be easily read, and the detection needle 130 may be provided in various structures that allow the worker to grip and utilize in various side track buffer alignment environments.

The vertical column 124 may extend downward from the fastening member 122 so as to be adjacent to a top surface of the horizontal member 110, and the detection needle 130 configured to detect a position by reading the scale S of the horizontal member 110 may be disposed at an end of the vertical column 124. Therefore, the vertical column 124 may be set to have an appropriate length according to a separation distance from the fastening member 122 to the horizontal jig 110 and a length of the detection needle 130 in a vertical direction. Here, it is obvious that the fastening member 120 may be variously modified according to a shape of the transfer rail R.

Figure 2:
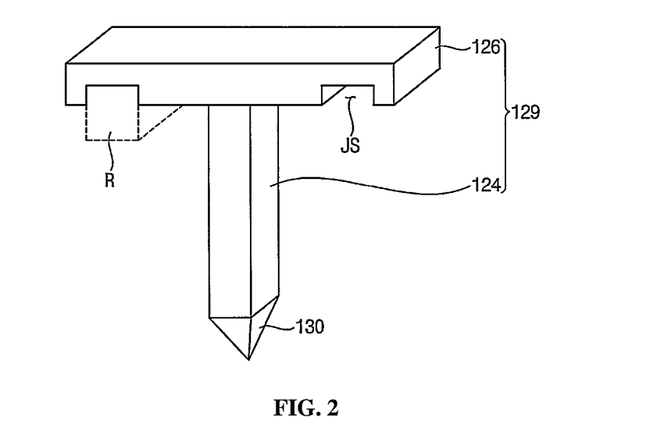
FIG. 2 is a perspective view showing a modified example of a vertical jig shown in FIG. 1.

FIG. 2 is a perspective view showing a modified example of a vertical jig shown in FIG. 1. A modified vertical jig according to example embodiment may have the same configuration as the vertical jig shown in FIG. 1 except for a modified fastening member. Accordingly, in FIG. 2, the same reference numerals will be used for the same elements of FIG. 1, and further detailed descriptions thereof will be omitted.

Referring to FIG. 2, according to example embodiments of the present disclosure, a modified vertical jig 129 may include a modified fastening member 126 fixed to a pair of rails, and the vertical column 124 may extend downward from a rear surface of a central portion of the modified fastening member 126 so as to be adjacent to the top surface of the horizontal jig 110.

In this case, the modified fastening member 126 may be configured as a horizontal bar coupled to the transfer rail R, which is configured as a pair of traveling rails arranged in parallel with each other on the same horizontal plane, so as to be placed over the transfer rail R in a direction that is perpendicular to the transfer rail R. A coupling space JS for accommodating each of the traveling rails may be disposed on a rear surface of the modified fastening member 126 so as to be coupled to an upper region of the traveling rail or coupled to traveling rail to accommodate an entire traveling rail.

Therefore, the coupling space JS may be formed at both ends of the horizontal bar at intervals corresponding to a separation distance between the traveling rails according to a standard of the transfer rail R for the ceiling conveyance device provided on a ceiling.

In this case, a width of the coupling space JS may be set to allow the coupling space JS to be fit to the traveling rail, and may be set to have a tolerance range of a separation distance between the side track buffer 200 and the transfer rail R. In addition, the vertical column 124 may be coupled to the horizontal bar to extend downward from the central portion of the modified fastening member 126 so as to be located in a central portion between the coupling spaces JS disposed at both ends of the modified fastening member 126, respectively. Accordingly, the vertical column 124 may be located at a central portion between the pair of traveling rails.

When the pair of traveling rails are accommodated in the coupling space JS so as to be coupled to the horizontal bar, the vertical column 124 may extend downward from the central portion between both traveling rails so as to be adjacent to the top surface of the horizontal jig 110, and coordinates of an intersection point CP may be detected by the detection needle 130 fixed to the end of the vertical column 124.

Therefore, a buffer separation distance, which is a separation distance between the central axis C passing through the central portion of the bottom plate 220 and the central portion between the pair of traveling rails, may be detected. In this case, since the coupling space JS is coupled to the traveling rail within a tolerance range of the buffer separation distance, the buffer separation distance detected by the coupling of the horizontal bar and the traveling rail may be detected within the tolerance range so as to be detected as a separation distance having reliability.

In one embodiment, the detection needle 130 may detect the scale S corresponding to the intersection point CP of the horizontal jig 110 and the vertical jig 120. For example, the detection needle 130 may be fixed to the end of the vertical column 124 in an inverted triangular shape having a pointed part, and a contact point between the pointed part and the scale S may be detected as the intersection point CP. Here, the intersection point CP may be manually detected by the worker, or may be automatically detected by arranging a detection device such as a position detection sensor on the detection needle 130 as will be described below.

In this case, since the scale S indicates a unit of a length by using the center of the fastening part 222 as the origin point, coordinates of the scale S detected by the intersection point CP may represent a length from the fastening part 222 to the intersection point CP. Since the fastening part 222 is located at a center of the bottom plate 220, the intersection point CP may represent a horizontal distance between a center of the side track buffer 200 and the transfer rail R.

In particular, since the vertical column 124 is fixed to a central portion of the fastening member 122 to extend downward, a position of the horizontal jig 110 detected by the detection needle 130 provided at the end of the vertical column 124 may be located at a vertical lower portion of the transfer rail R. Accordingly, the buffer separation distance, which is a horizontal distance between the side track buffer 200 and the transfer rail R, may be detected by the detection of the intersection point CP.

When the buffer separation distance is detected, the buffer frame 210 may be moved and arranged so that the buffer separation distance and the reference separation distance may match each other. The movement of the buffer frame 210 may be manually performed by the worker when the side track buffer 200 is installed, or may be automatically performed by a controller as will be described below.

Accordingly, the buffer separation distance, which is an actual separation distance between the central portion of the bottom surface 220 of the side track buffer 200 and the transfer rail R, may be easily arranged by the alignment jig 100 to match the reference separation distance, which is a separation distance required based on the transfer rail that is already installed.

The worker may ascend to a ceiling region of a FAB, which is a semiconductor manufacturing factory, to directly install the alignment jig 100 on the side track buffer 200 and the transfer rail R so as to detect the buffer separation distance with naked eyes and determine whether the buffer separation distance matches the reference separation distance, which is the separation distance required from the transfer rail R, and when the buffer separation distance does not match the reference separation distance, the worker may manually move the buffer frame 210 to allow the buffer separation distance to match the reference separation distance.

Accordingly, even when a conveyance vehicle for arranging the side track buffer is not driven along the transfer rail R, the side track buffer 200 may be easily installed at an accurate position based on the transfer rail R by using the alignment jig.

The alignment jig 100 as described above may be used in a manual mode in which the worker ascends to the ceiling to manually perform the arrangement when the side track buffer 200 is installed on the ceiling of the FAB, and may also be fixed to the side track buffer 200 and the transfer rail R in a buffer region to automatically arrange the position of the side track buffer.

Figure 3:
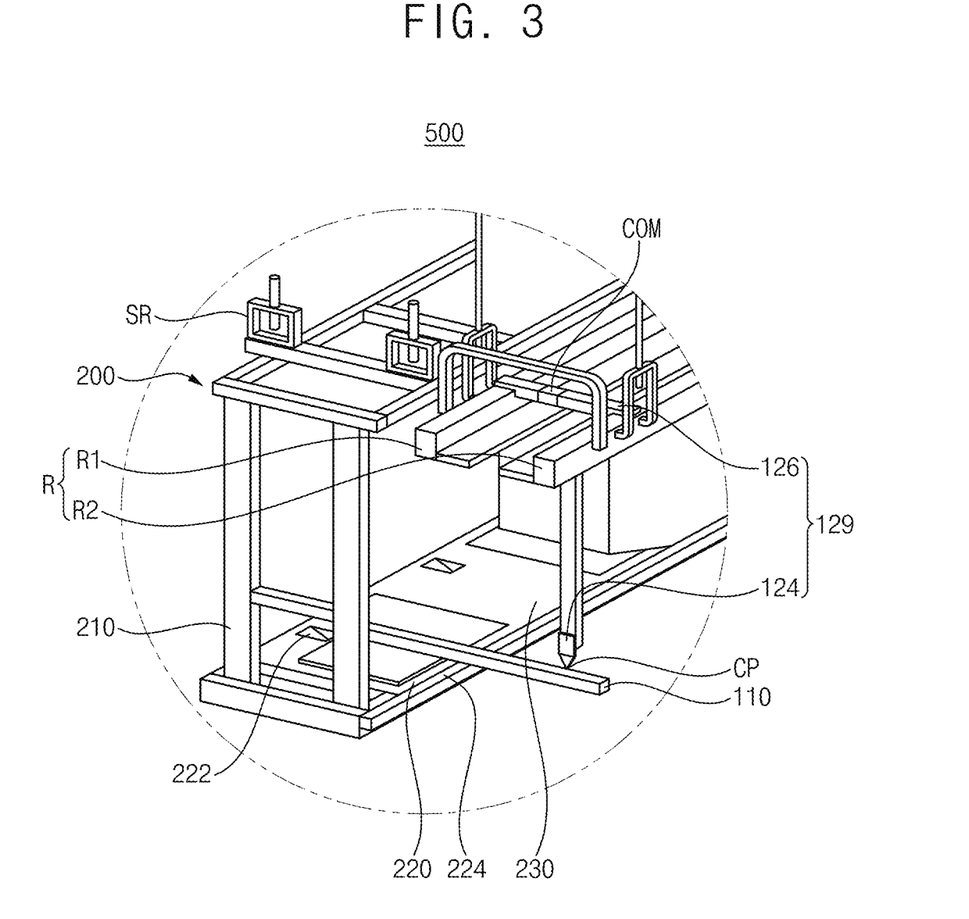
FIG. 3 is a schematic view showing a side track buffer system including an alignment jig according to one embodiment of the present disclosure.
Figure 4:
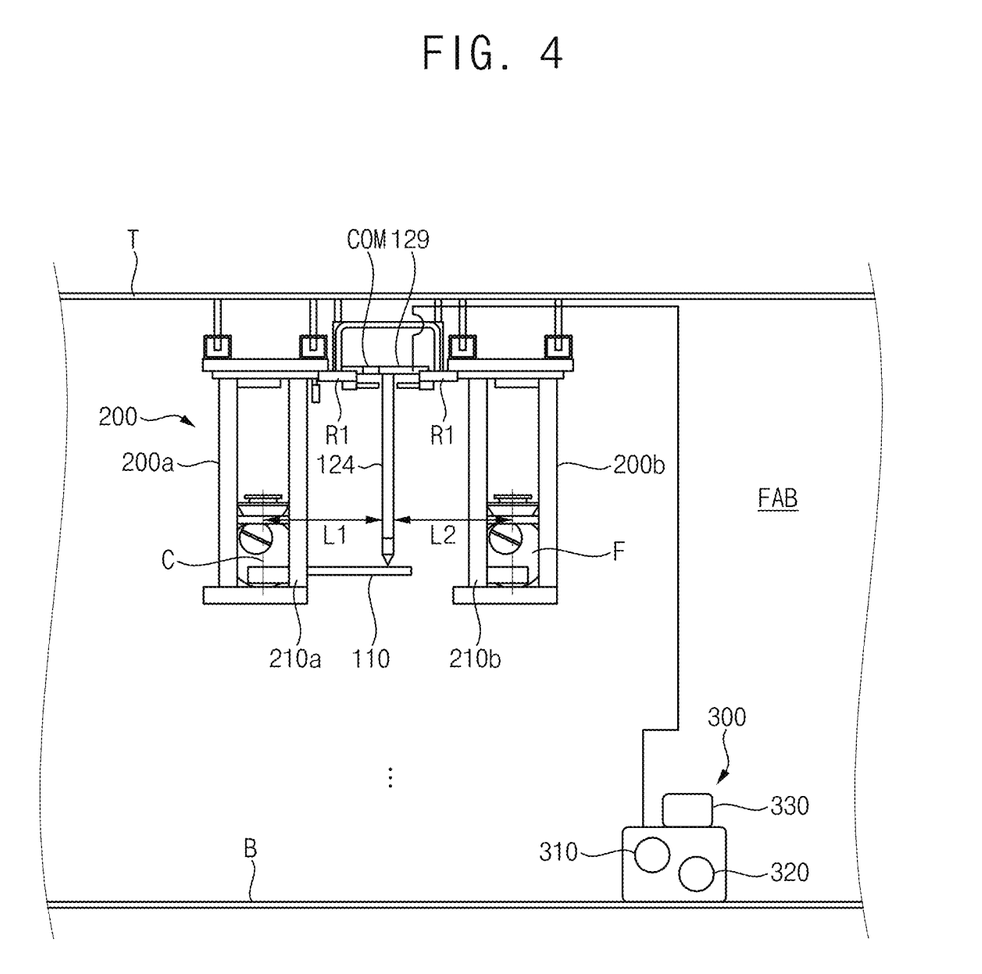
FIG. 4 is a schematic view showing a state in which the side track buffer system shown in FIG. 3 is installed in a semiconductor element manufacturing FAB.

FIG. 3 is a schematic view showing a side track buffer system including an alignment jig according to one embodiment of the present disclosure, and FIG. 4 is a schematic view showing a state in which the side track buffer system shown in FIG. 3 is installed in a semiconductor element manufacturing FAB. In FIG. 3, the transfer rail may include the pair of traveling rails, and a side track buffer system including the alignment jig described with reference to FIG. 2 has been disclosed. However, it is obvious that the side track buffer system may be configured by using the alignment jig described with reference to FIG. 1 when the transfer rail is configured as a single traveling rail.

Referring to FIGS. 3 and 4, according to one embodiment of the present disclosure, a side track buffer system 500 may include: a side track buffer 200 including at least one buffer port 230 disposed on a side portion of a transfer rail R to temporarily accommodate a FOUP in which a semiconductor substrate is stored; an alignment jig 100 including a horizontal jig 110 fixed to the side track buffer 200 and a vertical jig 129 fixed to the transfer rail R, and configured to detect an alignment position of the side track buffer 200; and an alignment controller 400 configured to arrange the side track buffer 200 to the alignment position.

In one embodiment, the side track buffer 200 may be provided as a component of a ceiling conveyance device disposed on a ceiling of a clean room that constitutes a semiconductor FAB for manufacturing a semiconductor element to transfer the substrate among process facilities (not shown), which are configured to perform unit processes for manufacturing the semiconductor element, respectively, and the side track buffer 200 may include: a buffer frame 210 fixed to a ceiling T of the semiconductor FAB so as to be suspended from the ceiling T from a side portion of the transfer rail R; a bottom plate 220 constituting a bottom of the buffer frame 210 and disposed under the side portion of the transfer rail R for the ceiling conveyance device; and at least one buffer port 230 arranged on the bottom plate 220 to accommodate a conveyance vehicle in which the semiconductor substrate is stored.

A plurality of process facilities may be disposed on a floor B of the semiconductor FAB, and the transfer rail R for transferring a conveyance vehicle (not shown) in which the FOUP F including a processing wafer is accommodated may be fixed to the ceiling T that is opposite to the floor B so as to be arranged in a line shape.

A load port for loading and unloading the wafer may be disposed in one-to-one correspondence with the process facility on a side portion of the process facility disposed on the floor B. When the FOUP F in which a plurality of substrates are accommodated is supplied to the load port, the FOUP F may be loaded into the process facility to perform a unit process on the wafer, and when the processing for all wafers is completed, the wafers may be accommodated again in the FOUP F so as to be unloaded by the load port.

The FOUP F located in the load port may be accommodated in the conveyance vehicle so as to be transferred to a load port of a subsequent process facility for a subsequent process along the transfer rail R. Therefore, the transfer rail R may pass through an upper portion of the load port provided in the process facility, and the conveyance vehicle may ascend the FOUP F from a source port to unload the FOUP F and may descend the FOUP F to a target port to load the FOUP F.

In this case, the side track buffer 200 for temporarily accommodating the FOUP F provided in the conveyance vehicle according to a variation of a traveling environment for traveling along the transfer rail R may be installed on the side portion of the transfer rail R in the buffer region, which is a specific region of the semiconductor FAB. In addition, the side track buffer 200 may be disposed in the buffer region of the semiconductor FAB for the purpose of storing an empty FOUP F that has transferred the wafer.

The side track buffer 200 may be adjacent to the transfer rail R disposed on the ceiling to exchange the FOUP F between the conveyance vehicle and the buffer port 230. Accordingly, the side track buffer 200 may be fixed to the ceiling T of the semiconductor FAB similarly to the transfer rail R.

For example, the buffer frame 210 may be fixed to the ceiling T so as to be suspended from the ceiling T by a fixing rail SR while being arranged on the side portion of the transfer rail R, and the bottom plate 220 having a flat plate shape may be located on the bottom of the buffer frame 210. The at least one buffer port 230 capable of accommodating the FOUP F may be disposed on the bottom plate 220.

The buffer frame 210 may be provided as a three-dimensional frame having a sufficient height, the fixing rail SR may be coupled to an upper portion of the buffer frame 210, and the bottom plate 220 may be disposed at a lower portion of the buffer frame 210 to support the buffer port 230. The buffer frame 210 may have a length corresponding to a number of buffer ports 230 and a width corresponding to the FOUP F, and may be provided to have a height that is sufficient to accommodate the FOUP F upward.

The bottom plate 220 may be a supporting plate provided on the bottom of the buffer frame 210, and may include a fastening part 222 configured to accommodate and support the buffer port 230 and fix the horizontal jig 110. Therefore, various structures that are flat plates having rigidity to support the buffer port 230 in which the FOUP F is accommodated and the horizontal jig 110 and flatness to ensure a horizontal state of the horizontal jig 110 may be provided as the bottom plate 220.

The fastening part 222 configured to accommodate the fastening protrusion 114 provided on the horizontal jig 110 may be provided at the central portion of the bottom plate 220. According to the present embodiment, the fastening part 222 may be provided in a form of a hole having the central axis C passing through the central portion of the buffer frame 210 as an axis so as to be provided as a distance measurement origin point of the horizontal jig 110 fixed to the fastening part 222. In other words, a reference point of the scale S provided on the horizontal jig 110 may be set as the center of the fastening part 222.

The buffer port 230 may be configured as a fixed port fixed to the bottom plate and/or a movable port capable of moving horizontally with respect to the bottom plate according to configurations of the side track buffer 200 and the ceiling conveyance device.

When the side track buffer 200 is accurately arranged to have the reference separation distance from the transfer rail R, the FOUP F may be transferred to the buffer port 230 fixed by a horizontal driver (not illustrated) provided in the ceiling conveyance device. Accordingly, the FOUP F may be accurately accommodated in the buffer port 230 corresponding thereto.

In some example embodiments, the buffer port 230 may move from the bottom plate 220 to the lower portion of the transfer rail R. When the conveyance vehicle fixed to the transfer rail R enters the buffer region, the buffer port 230 may move in the horizontal direction to a lower portion of the conveyance vehicle within the buffer frame 210. In this case, when the side track buffer 200 is accurately arranged, since the buffer port 230 is accurately located under the conveyance vehicle, the FOUP F descending from the conveyance vehicle may be accurately located in the buffer port 230. When the buffer port 230 is located under the conveyance vehicle, the FOUP F may descend from the conveyance vehicle so as to be loaded into the buffer port 230, and the buffer port 230 may return to a port position of the buffer frame 210 to accommodate the FOUP F.

In example embodiments, the buffer frame 210 may include a left frame 210a and a right frame 210b disposed on left and right sides of the transfer rail R, respectively. Accordingly, a pair of side track buffers 200a and 200b may be disposed on the left and right sides of the transfer rail R. Therefore, the conveyance vehicle transferred to the buffer region may load the FOUP F into a track buffer having an empty buffer port 230 among a left track buffer 200a and a right track buffer 200b.

When the FOUP F is loaded into the buffer port 230, when a separation distance between the buffer frame 210 and the conveyance vehicle is not accurately arranged, the buffer port 230 and the conveyance vehicle may not be accurately arranged. When the FOUP F descends from the conveyance vehicle even though the buffer port 230 is not located under the conveyance vehicle, a risk of damage of the FOUP F caused by a collision with a conveyance port BP may be increased.

Accordingly, the alignment jig 100 including the vertical jig 129 and the horizontal jig 110 may be provided as a device for accurately setting the position of the buffer frame 210 based on the conveyance vehicle.

In this case, the horizontal jig 110 may be fixed and installed to the bottom plate 220, and the vertical jig 129 may be fixed to the transfer rail R located in the buffer region to extend downward. The horizontal jig 110 may be fixed to the bottom plate 220 to extend to the lower portion of the transfer rail R so as to be perpendicular to the boundary line 224 of the bottom plate 220 in the horizontal direction that is parallel to the bottom plate 220.

In example embodiments, the vertical jig 129 may be fixed to the transfer rail R including a pair of traveling rails R1 and R2. The horizontal bar 126 may be fixed so as to be perpendicularly placed over the pair of rails R1 and R2, and the vertical column 124 coupled to the central portion of the horizontal bar 126 may extend downward so as to be adjacent to the top surface of the horizontal jig 110.

The distance scale S marked on the top surface of the horizontal jig 110 may be recognized through the detection needle 130 provided at the end of the vertical column 124. The vertical jig 129 extending downward from the transfer rail R may make contact with the horizontal jig 110 located under the vertical jig 129 at a contact point CP, and an origin point of the scale S may be set to be the central axis C, so that coordinates detected from the scale S may be detected as a distance between the central axis C of the buffer frame 210 and the central portion of the transfer rail R. Accordingly, the contact point CP may be obtained as the buffer separation distance L, which is the separation distance between the side track buffer 200 and the transfer rail R.

The alignment jig 100 may have substantially the same configuration as the alignment jig described with reference to FIG. 2. Accordingly, the horizontal bar 126 may be arranged to be located at the central portion of the transfer rail R, and the vertical column 124 may be coupled to the horizontal bar 210 so as to extend vertically downward from the central portion of the transfer rail R. Therefore, the horizontal jig 110 making contact with the vertical column 124 may intersect the central portion of the transfer rail R so as to be detected as the contact point CP. In other words, the contact point CP may be set as a contact position between the vertical column 124 and the horizontal jig 110 in the central portion of the transfer rail R.

When the transfer rail R includes the pair of traveling rails R1 and R2, the horizontal bar 126 may be arranged so as to be placed over the pair of traveling rails R1 and R2, and the vertical column 124 may extend downward from a center of a gap between the pair of traveling rails R1 and R2. In other words, the vertical jig 129 may extend downward from the central portion of the transfer rail R from which the conveyance vehicle is suspended in the buffer region.

The horizontal jig 110 may be configured as an elongated member having a surface on which a distance unit indicating a distance from the central axis C is set, and the horizontal jig 110 may be installed so that an origin point of the distance unit matches the central axis C. An opposite end spaced apart from an end of the horizontal jig 110 in which the origin point is located may extend so as to be located under the transfer rail R.

Therefore, the distance unit of the horizontal jig 110 detected at the contact point CP in which the vertical jig 129 and the horizontal jig 110 make contact with each other may represent a horizontal distance from the central axis C of the buffer frame 210 to the contact point CP. In particular, the contact point CP may be automatically detected by using a position signal capable of recognizing the contact point CP.

In example embodiments, a signal generator configured to generate mutually different position signals according to a distance set based on the central axis C may be disposed on the surface of the horizontal jig 110, and a detection sensor configured to obtain position information by contact with the signal generator may be at an end of the detection needle 130, so that a distance between the contact point CP and the central axis C may be automatically detected. The distance between the contact point CP and the central axis C may be obtained as the buffer separation distance L between the transfer rail R and the side track buffer 200.

Since the buffer separation distance L determines the position of the side track buffer 200 based on the transfer rail R, when the side track buffer 200 is configured as the left track buffer 200a and the right track buffer 200b disposed on the left and right sides of the transfer rail R, the horizontal jig 110 may also be provided for each of the track buffers 200a and 200b, and the buffer separation distance L may also be individually obtained as a left separation distance L1 and a right separation distance L2.

The buffer separation distance L may be transmitted to the alignment controller 400 so as to be used as data for determining an alignment position or an installation position of the buffer frame 210. Therefore, the left separation distance L1 may be used as data for determining an alignment position of the left track buffer 200a, and the right separation distance L2 may be used as data for determining an alignment position of the right track buffer 200b.

In example embodiments, the vertical jig 129 may include a data communication device COM capable of calculating the buffer separation distance L from the contact point CP detected from the detection needle 130 or transmitting data on the buffer separation distance L that is directly detected to the outside. For example, the data communication device may include a wired modem or a wireless communication chip. Accordingly, the data on the buffer separation distance L may be transmitted to the alignment controller 300 through the data communication device COM.

The alignment controller 300 may arrange the position of the side track buffer 200 by comparing the buffer separation distance L with a set reference separation distance. According to the present embodiment, the alignment controller 300 may be disposed on the floor B of the semiconductor FAB to automatically arrange the position of the side track buffer 200 while the worker has not ascended to the ceiling.

In example embodiments, the alignment controller 300 may include: a data detector 310 connected to the vertical jig 129 to obtain the buffer separation distance L; a calculator 320 configured to detect an alignment position of the buffer frame 210 by comparing the buffer separation distance L with the reference separation distance; and a driver 330 configured to move the buffer frame 210 to the alignment position.

The data detector 310 may include: a signal receiver configured to receive a signal related to the buffer separation distance L from the communication device COM; and a detection memory capable of storing the data on the buffer separation distance L. In this case, the signal receiver may be configured as a data signal receiver capable of sharing a signal protocol with the communication device COM so as to receive a data signal transmitted from the communication device COM. For example, the calculator 320 may obtain a distance deviation by which the center of the bottom plate moves to allow the buffer separation distance L to match the reference separation distance by comparing the buffer separation distance L with the reference separation distance.

The calculator 320 may include: an input device configured to receive and store the reference separation distance from the worker; a reference memory configured to store the received reference separation distance; and a calculation processor configured to calculate the reference separation distance and the buffer separation distance L to obtain the distance deviation. Accordingly, the reference separation distance and the buffer separation distance L may be compared with each other by a calculation algorithm to determine driving characteristics for the arrangement of the side track buffer 200.

Since a position of the transfer rail R is specified in a design stage of the ceiling conveyance device, the side track buffer 200 has to be disposed at a position that is appropriate for loading and unloading of the FOUP F based on the position of the transfer rail R. Accordingly, a design position of the buffer frame 210, which is appropriate for the loading and unloading of the FOUP, may be determined based on the position of the transfer rail R, and a distance from the design position to a position of a center of the transfer rail R may be set as the reference separation distance.

The calculator 320 may obtain the distance deviation by which the center of the bottom plate 220 moves to allow the buffer separation distance L to match the reference separation distance. Since a reference point for measuring the buffer separation distance L is the fastening part 222 through which the central axis C of the bottom plate 220 passes, the distance deviation may be resolved by moving the central axis C of the bottom plate 220. In other words, the buffer frame 210 may be moved to allow the detected buffer separation distance L to match the reference separation distance so that the central axis C of the bottom plate 220 may be arranged to be an origin point of the reference separation distance.

Accordingly, the distance deviation may include: a negative deviation in which the central axis C of the bottom plate 220 is located too close to the vertical jig 129 as the buffer separation distance L is shorter than the reference separation distance; and a positive deviation in which the central axis C of the bottom plate 220 is located too far from the vertical jig 129 as the buffer separation distance L is longer than the reference separation distance.

Although not shown, the alignment controller 300 may further include a display connected to the calculator 320 to provide distance deviation information to the worker by expressing the negative deviation and the positive deviation as a negative number or a positive number based on a current position of the central axis C of the bottom plate 220.

In this case, the display and an input device may be implemented by the same device by configuring the display as a user interface capable of inputting the reference separation distance. For example, the display may be used as the input device for inputting a reference input distance by configuring the display as a touch screen capable of performing a data input operation by a touch operation.

The driver 330 may drive the fixing rail SR configured to fix the buffer frame 210 to the ceiling T according to the positive and negative deviations determined by the calculator 320. When the distance deviation is the negative deviation, the buffer frame 210 may be located closer to the transfer rail R than a position predetermined in the design stage, so that the position of the buffer frame 210 has to be corrected to allow the buffer frame 210 to be located further away from the transfer rail R. In this case, the driver 330 may move the buffer frame 210 away from the vertical jig 129 to arrange an end of the reference separation distance to match the center of the bottom plate 220.

In addition, when the distance deviation is the positive deviation, the buffer frame 210 may be located farther from the transfer rail R than the position predetermined in the design stage, so that the position of the buffer frame 210 has to be corrected to allow the buffer frame 210 to be located closer to the transfer rail R. In this case, the driver 330 may move the buffer frame 210 closer to the vertical jig 129 to arrange the end of the reference separation distance to match the center of the bottom plate 220.

Accordingly, when the side track buffer 200 is installed on the ceiling of the semiconductor FAB, an interval between the transfer rail R and the side track buffer 200 may be automatically detected so that the position of the buffer frame 210 may be automatically arranged to match the set reference separation distance.

According to a conventional side track buffer, an alignment jig capable of detecting the buffer separation distance has not been provided, so that separate driving of a conveyance device to arrange the side track buffer has been required, and a worker has directly ascended to a periphery of the ceiling of the semiconductor FAB to adjust an installation position of the side track buffer. However, according to the present disclosure, the buffer separation distance may be automatically detected by using the alignment jig fixed to the buffer frame and the transfer rail, and the position of the buffer frame may be automatically arranged according to the distance deviation from the reference separation distance, so that an installation position of the side track buffer may be automatically specified. Accordingly, an installation error of the side track buffer may be automatically detected without alignment driving of the conveyance vehicle, and the side track buffer may be installed at an accurate position.

Figure 5:
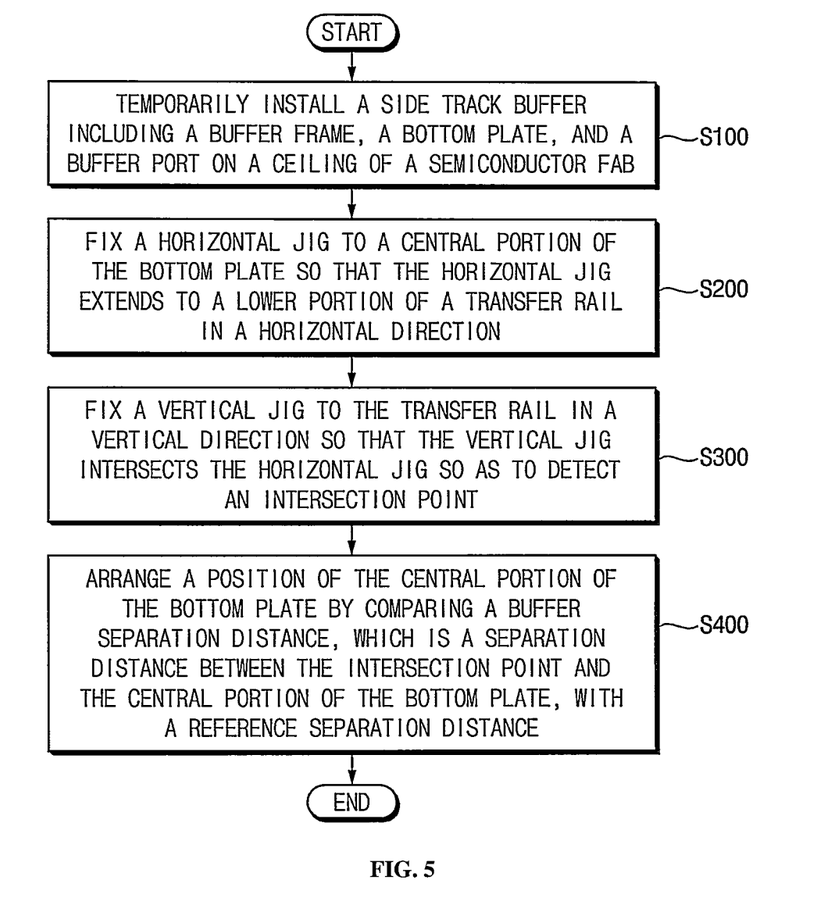
FIG. 5 is a flowchart showing a method of automatically arranging an installation position of a side track buffer in the side track buffer system shown in FIGS. 3 and 4.

FIG. 5 is a flowchart showing a method of automatically arranging an installation position of a side track buffer in the side track buffer system shown in FIGS. 3 and 4.

First, a side track buffer 200 may be temporarily installed on a ceiling of a semiconductor FAB (step S100). For example, the side track buffer 200 may be temporarily installed on the ceiling T that is adjacent to a buffer region of a transfer rail R constituting a ceiling conveyance device.

In this case, the side track buffer 200 may include: a buffer frame 210 fixed to a ceiling T so as to be suspended from the ceiling T; a bottom plate 220 constituting a bottom of the buffer frame 210 and disposed under a side portion of a transfer rail R; and at least one buffer port 230 arranged on the bottom plate 220 to accommodate a FOUP F.

Since the side track buffer 200 is a device for temporarily storing the FOUP F transferred by the conveyance vehicle, the side track buffer 200 needs to be accurately aligned with the conveyance vehicle configured to store the FOUP. Accordingly, when the side track buffer 200 is installed in the buffer region, after the side track buffer 200 is temporarily installed, the side track buffer 200 may be arranged at an accurate installation position based on the transfer rail R and fixedly installed.

In this case, since the side track buffer 200 is fixed to the ceiling through a fixing rail SR coupled to an upper portion of the buffer frame 210, a position of the side track buffer 200 may be set based on a position of a center of the buffer frame 210 or a position of a center of the bottom surface 220 constituting the bottom of the buffer frame 210.

Next, after the buffer frame 210 is temporarily fixed to the ceiling T, an alignment jig 100 for detecting the position of the center of the bottom surface 220 may be installed.

Accordingly, a horizontal jig 110 may be fixed to a central portion of the bottom plate 220 so that the horizontal jig 110 may extend to a lower portion of the transfer rail R so as to be perpendicular to a boundary line 224 of the bottom plate 220 in a horizontal direction that is parallel to the bottom plate 220 (step S200), and a vertical jig 129 may be fixed to the transfer rail R so that the vertical jig 129 may extend in a vertical direction that is perpendicular to the horizontal direction to intersect the horizontal jig 110 so as to detect an intersection point CP (step S300).

In this case, the horizontal jig 110 and the vertical jig 129 may be manually installed by a worker, or may be provided in a state where the horizontal jig 110 and the vertical jig 129 are fixed to the bottom plate 220 and the transfer rail R. When the alignment jig 100 is manually provided, the provision may be performed by the worker who ascends to the buffer frame 210 by using a ladder from a floor of the semiconductor FAB. The worker may perform the installation such that the horizontal jig 110 is fastened and fixed to a fastening part 222 of the bottom plate 220, and the vertical jig 129 is placed over an end of the transfer rail R located in the buffer region. Accordingly, the horizontal jig 110 may extend to a lower portion of the transfer rail R, and the vertical jig 129 may extend downward from the transfer rail R so as to be adjacent to a top surface of the horizontal jig 110.

Then, a position of the central portion C of the bottom plate may be arranged by comparing a buffer separation distance L, which is a separation distance between the intersection point CP and the central portion C of the bottom plate 220, with a reference separation distance (step S400).

In example embodiments, the buffer separation distance L may be directly detected from a distance measurement scale S corresponding to the intersection point CP from the horizontal jig 110 having a top surface marked with the scale S, and the buffer frame 210 may be horizontally moved to match the buffer separation distance L to a preset reference separation distance.

The buffer separation distance L may be directly detected by the worker who manually installs the alignment jig 100 from a gradation, which is the scale S marked on the horizontal jig 110. In this case, the worker may compare the buffer separation distance with the reference separation distance by using information on the reference separation distance, which is a separation distance indicating an installation position in a design stage.

Then, the buffer frame 210 may be directly and horizontally moved so as to be arranged so that the buffer separation distance and the reference separation distance match each other. Thereafter, the fixing rail SR disposed on an upper portion of the buffer frame may be fixed so that the side track buffer 200 may be stably fixed to the ceiling T.

When the stable fixing of the side track buffer 200 is completed, the horizontal jig 110 and the vertical jig 129 may be removed and recovered from the bottom plate 220 and the transfer rail R.

In some example embodiments, the buffer separation distance L may be automatically obtained, and the buffer frame 210 may be automatically arranged according to comparison of the buffer separation distance L with the reference separation distance. For example, a detection sensor may be disposed on a detection needle 130 at an end of the vertical jig 129, and a signal generator corresponding to the scale S may be disposed, so that the intersection point CP may be recognized according to a position signal detected by the detection sensor, and a distance from the central portion C corresponding to the intersection point CP may be automatically detected as the buffer separation distance L.

The buffer separation distance L may be compared with a preset reference separation distance by a calculator 320 to obtain a distance deviation, and a driver 330 may move a position of the buffer frame 210 so that the distance deviation is within a set error range. Therefore, the buffer frame 210 may be stably fixed to the ceiling T by automatically arranging the position of the buffer frame 210 to the installation position and fixing the fixing rail SR.

Accordingly, the side track buffer 200 may be automatically and accurately installed at a position required by design, so that the side track buffer 200 may be arranged at the installation position without driving the conveyance vehicle.

According to the alignment jig and the side track buffer system including the same of the present disclosure, the vertical jig extending downward from a central portion of the transfer rail and the horizontal jig extending from the buffer frame located on the side portion of the transfer rail may be disposed, so that the buffer separation distance, which is a horizontal distance from a contact point of the vertical jig and the horizontal jig to a central axis of the buffer frame, may be easily obtained. The buffer frame may be horizontally moved to allow the buffer separation distance to match a set reference separation distance, so that the side track buffer may be accurately installed at a predetermined position. Accordingly, a collision between the buffer port and the FOUP caused by misalignment of the transfer rail and the side track buffer may be prevented.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. An alignment jig for arranging a side track buffer, the alignment jig comprising:
   a horizontal jig fastened to a bottom plate of the side track buffer to extend perpendicularly to a boundary line of the bottom plate, and formed at a top surface thereof with a distance measurement scale;
   a vertical jig fastened to a transfer rail of a ceiling conveyance device to extend downward so as to intersect the horizontal jig; and
   a detection needle fixed to an end of the vertical jig to detect the scale corresponding to an intersection point of the horizontal jig and the vertical jig so as to provide a buffer separation distance, which is a horizontal distance between the side track buffer and the transfer rail.

2. The alignment jig of claim 1, wherein the horizontal jig includes an elongated member including a fastening protrusion provided on a rear surface of one end of the elongated member, and including a gradation marked on the top surface of the horizontal jig in a unit of a predetermined distance and provided as the scale, so that the fastening protrusion is inserted into a fastening groove formed at a central portion of the bottom plate so as to be fastened to the bottom plate, and the gradation corresponding to the intersection point is provided as the buffer separation distance.

3. The alignment jig of claim 1, wherein the vertical jig includes a fastening member fastened to the transfer rail, and a vertical column fixed to the fastening member to extend downward.

4. The alignment jig of claim 3, wherein the transfer rail includes a pair of traveling rails arranged in parallel with each other on a same horizontal plane, and
the fastening member includes a horizontal bar coupled to each of the traveling rails so as to be placed over each of the traveling rails in a direction that is perpendicular to the traveling rail.

5. The alignment jig of claim 4, wherein the vertical column is coupled to a center of the horizontal bar to extend downward toward the horizontal jig.

6. A side track buffer system comprising:
a side track buffer including a buffer frame fixed to a ceiling so as be suspended from the ceiling, a bottom plate constituting a bottom of the buffer frame and disposed under a side portion of a transfer rail for a ceiling conveyance device, and at least one buffer port arranged on the bottom plate to accommodate a conveyance vehicle in which a semiconductor substrate is stored; and
an alignment jig including a horizontal jig fastened to the bottom plate to extend to a lower portion of the transfer rail so as to be perpendicular to a boundary line of the bottom plate in a horizontal direction that is parallel to the bottom plate, and a vertical jig fastened to the transfer rail in a buffer region of the transfer rail to extend in a vertical direction that is perpendicular to the horizontal direction, and configured to detect a distance between an intersection point of the horizontal jig and the vertical jig and the buffer frame as a buffer separation distance.

7. The side track buffer system of claim 6, wherein the horizontal jig includes an elongated member including a fastening protrusion protruding from a rear surface of one end of the elongated member so as to be fastened to a fastening groove formed at a central portion of the bottom plate, and including a distance measurement scale provided on a top surface that is symmetrical to the rear surface.

8. The side track buffer system of claim 7, wherein the vertical jig includes a fastening member fastened to the transfer rail, and a vertical column fixed to the fastening member to extend downward so as to intersect the elongated member.

9. The side track buffer system of claim 8, wherein the transfer rail includes a pair of traveling rails arranged in parallel with each other on a same horizontal plane,
the fastening member includes a horizontal bar coupled to each of the traveling rails and placed over each of the traveling rails in a direction that is perpendicular to the traveling rail, and the vertical column is coupled to a central portion of the horizontal bar to extend downward toward the horizontal jig.

10. The side track buffer system of claim 8, wherein the alignment jig further includes a detection needle fixed to an end of the vertical column to detect the scale corresponding to an intersection point of the horizontal jig and the vertical column so as to detect a distance between the central portion of the bottom plate and the intersection point as the buffer separation distance.

11. The side track buffer system of claim 6, further comprising an alignment controller configured to arrange a position of the buffer frame by comparing the buffer separation distance with a reference separation distance.

12. The side track buffer system of claim 11, wherein the alignment controller includes:
a data detector connected to the vertical jig to obtain the buffer separation distance;
a calculator configured to detect an alignment position of the buffer frame by comparing the buffer separation distance with the reference separation distance; and
a driver configured to move the buffer frame to the alignment position.

13. The side track buffer system of claim 12, wherein the vertical jig includes a communication device configured to transmit a data signal related to the buffer separation distance, and
the data detector includes a signal receiver configured to receive the signal related to the buffer separation distance from the communication device.

14. The side track buffer system of claim 12, wherein the calculator is configured to obtain a distance deviation by which a center of the bottom plate moves to allow the buffer separation distance to match the reference separation distance by comparing the buffer separation distance with the reference separation distance.

15. The side track buffer system of claim 14, wherein the distance deviation includes:
a negative deviation in which a central axis of the bottom plate is adjacent to the vertical jig as the buffer separation distance is shorter than the reference separation distance; and
a positive deviation in which the central axis of the bottom plate is spaced apart from the vertical jig as the buffer separation distance is longer than the reference separation distance.

16. A method of arranging a side track buffer, the method comprising:
temporarily installing a side track buffer including a buffer frame fixed a ceiling so as to be suspended from the ceiling, a bottom plate constituting a bottom of the buffer frame and disposed under a side portion of a transfer rail for a ceiling conveyance device, and at least one buffer port arranged on the bottom plate to accommodate a front opening unified pod (FOUP);
fixing a horizontal jig to a central portion of the bottom plate so that the horizontal jig extends to a lower portion of the transfer rail so as to be perpendicular to a boundary line of the bottom plate in a horizontal direction that is parallel to the bottom plate;
fixing a vertical jig to the transfer rail so that the vertical jig extends in a vertical direction that is perpendicular to the horizontal direction to intersect the horizontal jig so as to detect an intersection point; and
arranging a position of the central portion of the bottom plate by comparing a buffer separation distance, which is a separation distance between the intersection point and the central portion of the bottom plate, with a reference separation distance.

17. The method of claim 16, wherein the arranging of the position of the central portion of the bottom plate includes:
directly detecting the buffer separation distance from a distance measurement scale corresponding to the intersection point from the horizontal jig having a top surface marked with the scale; and
horizontally transferring the buffer frame to match the buffer separation distance to the reference separation distance.

18. The method of claim 17, wherein the detecting of the buffer separation distance and the horizontally transferring of the buffer frame are performed manually by a worker located high from a floor so as to be adjacent to the buffer frame.

19. The method of claim 17, wherein the buffer separation distance is automatically obtained from a position of the scale obtained through a detection sensor provided at an end of the vertical jig.

20. The method of claim 19, wherein the buffer frame is automatically transferred by an external driver so that a deviation between the buffer separation distance and the reference separation distance is included within an error range.

* * * * *